Oct. 28, 1952   R. H. ROSS   2,615,345
FAN BELT TOOL

Filed Sept. 8, 1950   2 SHEETS—SHEET 1

Inventor
Raymond H. Ross

By *Clarence A. O'Brien and Harvey B. Jacobson*
Attorneys

Oct. 28, 1952   R. H. ROSS   2,615,345
FAN BELT TOOL
Filed Sept. 8, 1950                    2 SHEETS—SHEET 2
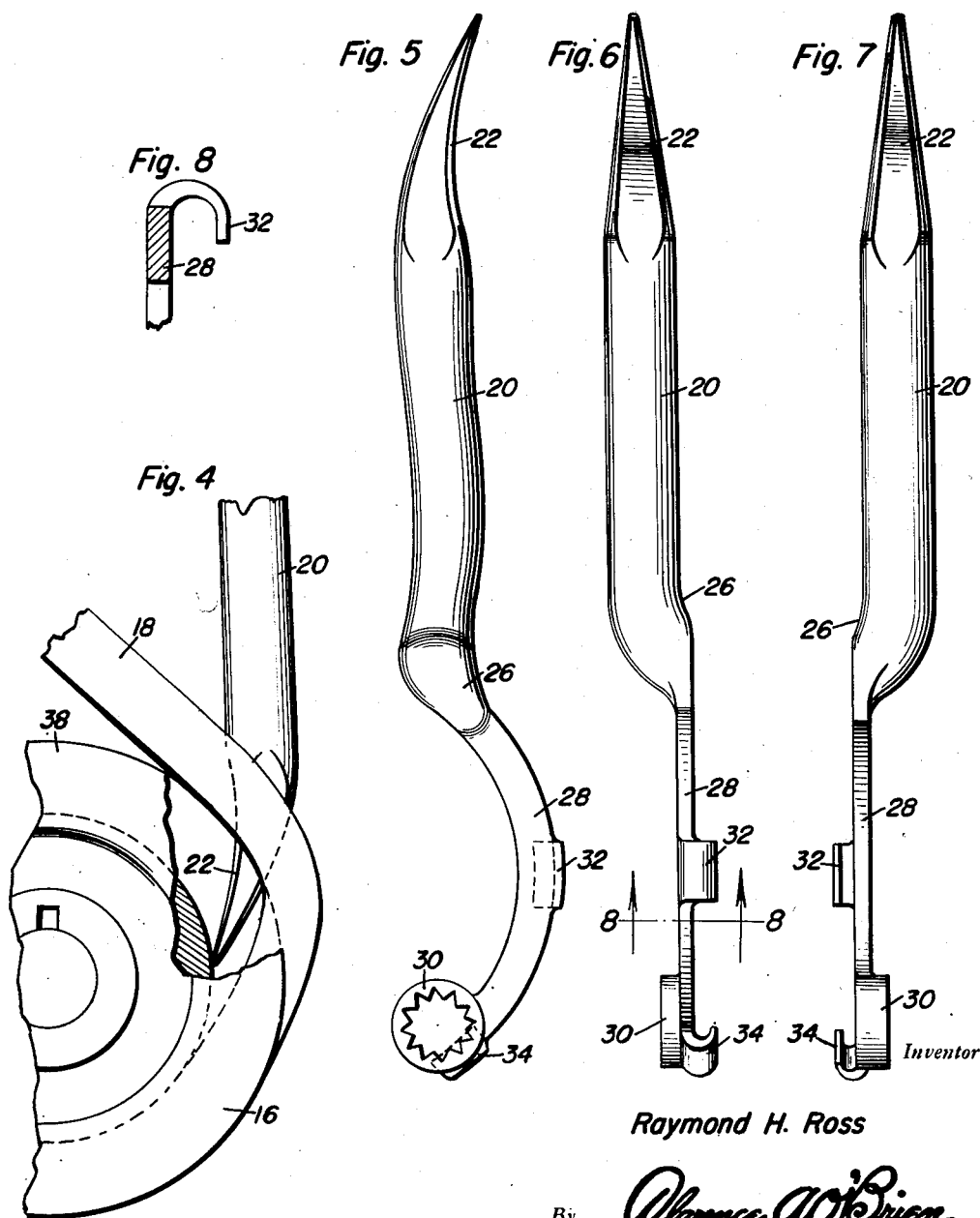
Inventor
Raymond H. Ross
By *Clarence A. O'Brien and Harvey B. Jacobson*
Attorneys Patented Oct. 28, 1952

2,615,345

UNITED STATES PATENT OFFICE 2,615,345

FAN BELT TOOL

Raymond H. Ross, Midland, Mich., assignor of fifty per cent to Clarence Ross, Lansing, Mich.

Application September 8, 1950, Serial No. 183,821

1 Claim. (Cl. 74—242.7)

This invention relates to tools and specifically to an improved tool for removing and applying fan belts on pulleys or any other type of belt in a pulley of the grooved type.

It is the primary object of the present invention to provide a tool which is capable of applying and removing a fan belt from a vehicle engine solely and entirely with one hand and without the necessity of rotating the belt on its pulleys in order to have it slip in place within the grooves of the pulleys.

Ancillary objects and features of importance will become apparent to those skilled in the art, in following the description of the illustrative form of the invention.

In the drawings:

Figure 4 is a fragmentary view of a pulley and belt showing the two used for pushing the generator toward the engine by employing the fan belt as one bearing surface and the generator pulley as another and also showing the fan belt being slipped from the pulley;

Figure 5 is a top view of the device;

Figure 6 is a side view of the device of Figure 5;

Figure 7 is another side view of the device in Figure 5, illustrating the reverse side structure from that shown in Figure 6; and, Figure 8 is a sectional view taken substantially on the line 8—8 of Figure 6 and in the direction of the arrows.

Figure 1:
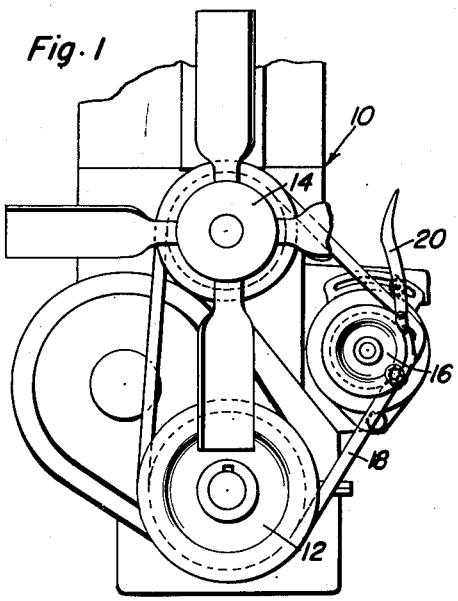
Figure 1 is a front view of a typical standard engine, portions being broken away which are unimportant in so far as the fan belt pulley is concerned and showing the belt about to be slipped in place on one of the pulleys of the engine assembly.

In carrying out this invention I have illustrated by way of environment a standard engine generally indicated at 10 which includes a lower or crank shaft pulley 12, a fan pulley 14 and a generator pulley 16. All of these pulleys are attached to their respective shaft as is normal in a vehicle engine. There is illustrated in Figure 1 a conventional fan belt 18 entrained around the three illustrated pulleys.

It is noted at this point that although one specific type of engine is illustrated in the drawings, due to space limitations other standard types are omitted. However, the actual tool shown in the various figures of the drawings may be adapted for use in connection with various types of engines so long as they have standard pulleys and belts. Moreover, it is contemplated to use this tool for removing belts from pulleys regardless whether the pulleys are employed with engines or not. A specific example of one of the many uses of the tools is to remove and apply the groove belts which are normally found in refrigerators that is, the belt or belts drivingly connecting the motor and the compressor.

The actual structure of the tool is seen best in Figures 5-7. There is a shank 20 which has a concavo-convex end 22, this end being arranged to pull the fan belt 18 from the generator pulley 16 as disclosed in Figure 4.

Near the lower end of the shank 20 there is a recess 26 into which the fan belt is arranged to slip in the operation of applying the belt to the pulley. This recess is simply a slightly dished out portion of the slightly curved shank 20 near the end thereof opposite from the concavo-convex end portion 22.

An arcuate arm 28 is fixed at one end to the shank 20 and has a wrench socket 30 fixed thereto. Although a closed end wrench socket is illustrated, it is apparent that other types may be used, for example an open end wrench socket. The purpose of the wrench socket is to loosen the generator or loosen any other nuts or bolts. Usually however, there is at least one bolt to loosen in order to move the generator so as to lessen the periphery defined by the three pulleys (12, 14, 16) in this particular portion of the engine assembly.

A hook or clamp 32, which is in the form of a substantially U-shaped in cross section cradle, is fixed to the arcuate arm 28 intermediate its ends and there is a similar hook or clamp 34 near the socket 30.

Figure 3:
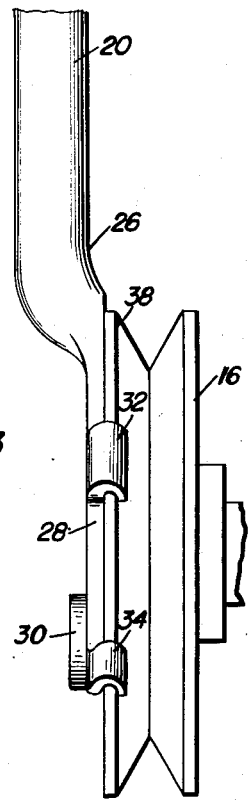
Figure 3 is an end view of the structure of Figure 2.
Figure 2:
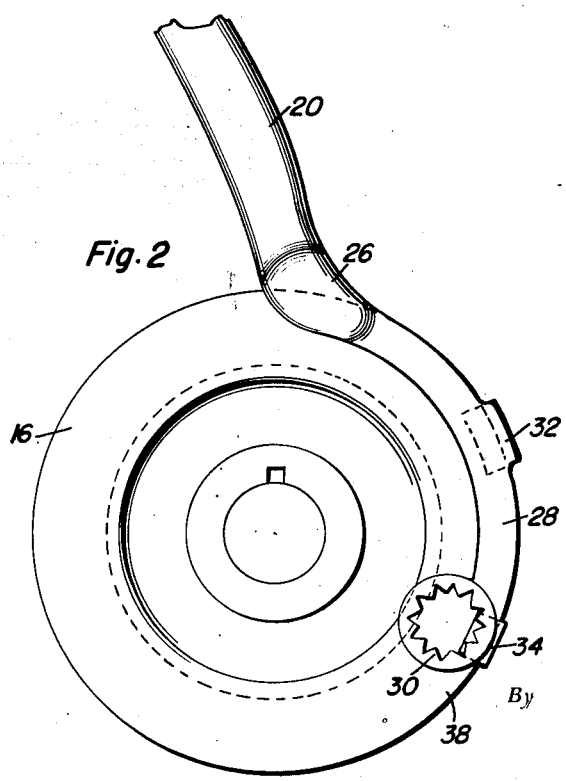
Figure 2 is an elevational view of a typical pulley together with a fragmentary part of the belt showing it in engagement with one of the flanges of the pulley.

The hooks are arranged to engage one flange 38 of one of the pulleys, for example the pulley 16 as disclosed in Figure 3, in order to seat the tool firmly when it is desired to place the fan belt upon the pulley 16 after manually inserting it in the grooves of the pulleys 12 and 14.

The operation involved in removing the fan belt is deemed quite apparent from inspection of Figure 4. To apply the fan belt after the generator, in the illustrative instance, has been moved toward the engine block the fan belt 18 is arranged over the shank 20 so that it slides into the recess 26. Then by rocking the two slightly the belt 18 slides along one of the smoothly curved walls forming the recess 26 and into the groove of the pulley. Thereafter the generator may be tightened so that the correct tension in the fan belt 18 is obtained.

Having described the invention, what is claimed as new is:

A drive belt installing tool comprising a rod of circular cross section, an integral, laterally offset, flat, arcuate bar extending forwardly from one end of the rod and adapted for face abutting engagement with one side of a pulley substantially flush with and conforming to the periphery thereof, and a pair of lateral, substantially U-shaped spaced hooks integral with the outer periphery of the bar and engageable with the peripheral portion of the pulley for supporting the rod tangentially thereon, said rod being longitudinally curved and engageable with a belt for guiding said belt on to the pulley.

RAYMOND H. ROSS.

REFERENCES CITED

The following references are of record in the file of this patent:

UNITED STATES PATENTS

| Number | Name | Date |
| --- | --- | --- |
| 2,121,129 | Malone | June 21, 1938 |
| 2,333,395 | Smith | Nov. 2, 1943 |
| 2,505,216 | Simmons et al. | Apr. 25, 1950 |